United States Patent
Lowery et al.

(10) Patent No.: US 8,458,907 B1
(45) Date of Patent: Jun. 11, 2013

(54) METHOD AND APPARATUS FOR EXTERIOR SURFACE TREATMENT OF INSULATED STRUCTURAL STEEL PANELS

(75) Inventors: William H. Lowery, Orinda, CA (US); Michael T. Lowery, Orinda, CA (US); John Lettko, Danville, CA (US)

(73) Assignee: Pre-Insulated Metal Technologies LLC, Vacaville, CA (US)

( * ) Notice: Subject to any disclaimer, the term of this patent is extended or adjusted under 35 U.S.C. 154(b) by 372 days.

(21) Appl. No.: 12/799,090

(22) Filed: Apr. 15, 2010

Related U.S. Application Data

(60) Provisional application No. 61/170,197, filed on Apr. 17, 2009.

(51) Int. Cl.
- *B24B 1/00* (2006.01)
- *B21D 33/00* (2006.01)
- *B32B 3/12* (2006.01)

(52) U.S. Cl.
USPC ......... 29/897.32; 29/897; 29/897.34; 29/458; 72/199; 72/203

(58) Field of Classification Search
USPC ......... 72/199–252.5; 29/897, 897.32, 897.34, 29/458
See application file for complete search history.

(56) References Cited

U.S. PATENT DOCUMENTS

| | | | | |
|---|---|---|---|---|
| 2,318,111 | A * | 5/1943 | Steinberger | 264/284 |
| 2,850,999 | A * | 9/1958 | Kaplan et al. | 29/469.5 |
| 2,928,124 | A * | 3/1960 | Hugger | 264/284 |
| 3,906,004 | A * | 9/1975 | Perry | 549/350 |
| 4,744,936 | A * | 5/1988 | Bittner, Jr. | 264/175 |
| 5,164,227 | A * | 11/1992 | Miekka et al. | 427/162 |
| 5,361,163 | A * | 11/1994 | Matsuda et al. | 359/452 |
| 6,187,455 | B1 * | 2/2001 | Eschauzier | 428/687 |
| 6,261,702 | B1 * | 7/2001 | McGuire et al. | 428/600 |
| 7,699,686 | B2 * | 4/2010 | Hahn et al. | 451/28 |
| 8,093,329 | B2 * | 1/2012 | Seneker et al. | 524/521 |
| 2006/0147745 | A1 * | 7/2006 | Choi et al. | 428/624 |
| 2007/0284047 | A1 * | 12/2007 | Preisner et al. | 156/387 |
| 2008/0060405 | A1 * | 3/2008 | Ball et al. | 72/234 |
| 2008/0134911 | A1 * | 6/2008 | Gelli et al. | 101/23 |
| 2008/0271836 | A1 * | 11/2008 | Richter et al. | 156/233 |
| 2010/0136362 | A1 * | 6/2010 | Hahn et al. | 428/577 |
| 2010/0256296 | A1 * | 10/2010 | Hong | 524/590 |

\* cited by examiner

*Primary Examiner* — Peter DungBa Vo
*Assistant Examiner* — Anthony Green
(74) *Attorney, Agent, or Firm* — Howard Cohen

(57) ABSTRACT

A method for providing a natural stucco appearance for a steel structural panel comprises providing a steel sheet and coating the exterior surface with a low gloss protective coating, and then embossing the exterior surface with a low relief pattern. The steel sheet is then embossed with a second, higher relief pattern under high pressure. The double embossment together with the low gloss coating achieves a natural stucco appearance.

6 Claims, 1 Drawing Sheet

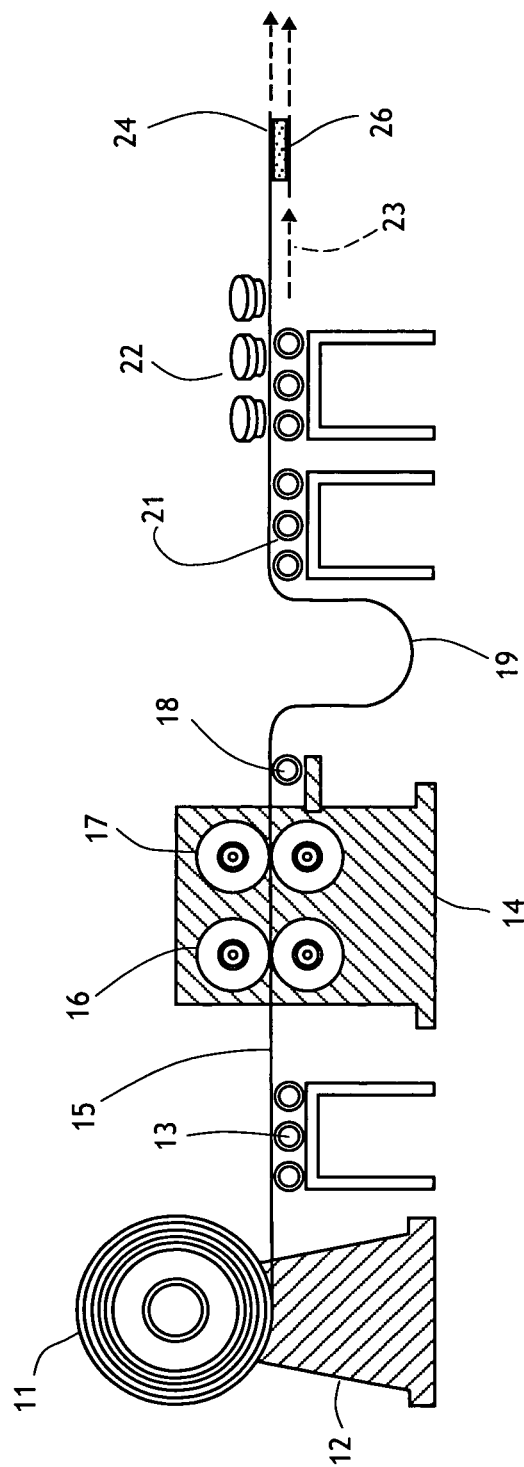

METHOD AND APPARATUS FOR EXTERIOR SURFACE TREATMENT OF INSULATED STRUCTURAL STEEL PANELS

CROSS-REFERENCE TO RELATED APPLICATIONS

This application claims the priority filing date benefit of Provisional Application No. 61/170,197, filed Apr. 17, 2009.

FEDERALLY SPONSORED RESEARCH

Not applicable.

SEQUENCE LISTING, ETC ON CD

Not applicable.

BACKGROUND OF THE INVENTION

1. Field of the Invention

This invention relates to insulated steel structural panels and, more particularly, to a method and apparatus for providing a natural-looking stucco appearance to those panels when they are manufactured.

2. Description of Related Art

The recent development of structural steel panels that incorporate highly effective insulation has been a boon to construction of commercial and industrial buildings. These panels are generally formed of a central core of expanded foam material that is sandwiched between two layers of steel sheathing in a product that may be manufactured economically in efficient production facilities and transported to a construction site. These panels may be used for exterior walls or roof panels of a building, or may be used to construct cold storage facilities inside existing warehouses. Insulated structural steel panels offer the advantages of quick and easy construction by bolt-on assembly to a steel framework, very high insulating values, sealed edge conformations that prevent air infiltration, and a high strength/weight ratio.

Typically, the steel layers that form the outer surfaces of the panels are painted or coated for esthetic purposes, as well as to protect the steel material from corrosion (although the steel is often galvanized for anti-corrosion purposes as well). It is also a common practice to emboss at least the outer steel sheet with a pattern that softens the visual appearance of the panel and reduces the industrial or "machine-made" impression of the panel. The embossing step typically takes place before the painting or coating process so that the paint or coating is not abraded or removed by the embossing rollers.

Despite the provision of embossment on the outer panel surfaces, many building designers choose to add a surface treatment to the insulated panels to produce a more earthy, recognizable and appealing appearance. Thus, a building constructed of insulated steel panels may be treated with a stucco exterior coating which softens the appearance of the steel outer skin. This coating, which may be sprayed onto the exterior surface of the building, adds a significant cost to the construction, and may be problematic in other ways. The stucco coating requires a period of warm and dry weather to enable the application and curing of the stucco, and some climates do not experience such weather very often. For example, insulated structural steel panels are frequently used in cold northern climes, where snow, rain, and sub-optimal temperatures may delay the application of an exterior stucco coating for many weeks. Thus the conclusion of a building project may be held up unduly, and building occupation and construction contract completion postponed.

BRIEF SUMMARY OF THE INVENTION

The present invention generally comprises a method and apparatus for manufacturing insulated structural steel paneling and, more specifically, imparting a surface texture to the exterior steel panel that appears very similar to a natural stucco surface.

The process is comprised of the following components and steps: Coiled 26 gauge steel is ordered pre-coated with a baked on (400° F.) textured ceramic pigmented polyester coating that has a very low gloss (~5%). The coil steel is first run through an 85 ton Memco™ M695-63 patterned high pressure primary embosser. The re-coiled steel is then run through an 85 ton Memco™ secondary embosser where it is forced under high pressure (3000 psi) between two forged matched rollers that utilize a PM-194 pattern to create a highly diverse textured appearance. This surface treatment is uniformly applied in a factory setting resulting in a much more durable and yet less expensive product.

The pre-coated, baked on (400 degree F.) textured ceramic pigmented polyester coating that has a very low gloss (~5%), together with the double-embossing is key to the remarkable stucco-like appearance of the product. This two-step double embossing process was previously unheard of in steel cladding manufacturing due to a belief that the double embossing would in some way distort the steel or mar the paint finish. In fact, the double embossing process does not distort the steel at all; it just imparts a highly diverse textured surface while maintaining its overall flatness tolerance. This highly diverse textured surface together with the very low gloss textured paint coating creates a metal panel that closely resembles a traditional stucco coated wall. Further, the surface pattern tends to appear non-directional when it is double embossed even though the individual embossments are, in fact, directional.

Many customers desire the look of stucco on their insulated metal wall panels. The customer may select the Adobe Texture™ product and provide dimensions for fabrication. The coiled steel sheet (e.g., 26 gauge) is supplied to the panel manufacturer with the very low gloss finish. When the coil is received by the manufacturer, it is run first through an 85 ton Memco™ M695-63 patterned high pressure primary embosser that imparts a low relief pattern in the steel surface. The steel is then run through the secondary embosser where the steel is forced under high pressure (~3000 psi) between two forged matched rollers that utilize a PM-194 pattern to create a highly diverse textured appearance. The steel continues through an automated continuous production line where it is used to produce the exterior layer of the insulated metal panels. The double embossing process can create a natural stucco-like appearance on any metal panel used as exterior wall cladding.

BRIEF DESCRIPTION OF THE DRAWING

FIG. 1 is a functional block diagram illustrating the method and apparatus to create a natural adobe surface appearance in the steel sheet used in the insulated structural panel assemblies.

DETAILED DESCRIPTION OF THE INVENTION

The present invention generally comprises a method and apparatus for manufacturing insulated structural steel paneling and, more specifically, imparting a surface texture to the exterior steel panel that appears very similar to a natural stucco surface.

With regard to FIG. 1, the process is initiated by providing a coiled roll 11 of sheet steel, typically 26 gauge or the like. The sheet steel is ordered painted or pre-coated, preferably with a textured ceramic pigmented polyester coating that is baked-on (~400° F.) and has a very low gloss (~5%). The coiled roll 11 is supported on a decoiling machine 12, and the steel sheet 15 is passed over transfer rollers 13 to an embossing machine 14. The embossing machine may comprise an 85 ton Memco embosser. The steel sheet 15 is first fed through a pair of primary embosser rollers 16 which are spaced apart sufficiently to impart high pressure to the sheet steel. The primary embosser may preferably comprise M695-63 patterned rollers, which impart a low-relief pattern that breaks up the smooth surface of the steel sheet. If 26 gauge steel is used, its thickness increases from the initial 0.45 mm thickness to 0.75 mm at this stage. The steel sheet may then be re-coiled for later use, or may be fed directly and sequentially into a secondary embosser 17.

The secondary embosser comprises two forged matched rollers that utilize a PM-194 pattern and squeeze the sheet under high pressure (3000 psi) to overstrike the second pattern onto the first embossment. The second embossment provides a deeper relief that the first embossment, and the thickness of the sheet is increased to 1.3 mm by the second embosser. This double embossing creates a highly diverse textured appearance. It should be noted that the double embossing does not disrupt or abrade the pigmented polyester coating; rather, it results in a natural stucco appearance. This result is unexpected by workers in the prior art, who have believed that double embossing would destroy the baked-on coating.

The steel sheet then passes over feed rollers 18 to a loop accumulator 19 which provides a slack feed to the remainder of the panel forming system. Feed rollers 21 lead the steel sheet to rollforming rollers 22, which may fabricate edge features such as tongue and groove elements, longitudinal ribs, or the like. The finished exterior panel 24 is then joined with the interior panel 23 and foam-in-place insulation 26 to form the completed steel insulated panel assembly. The foam insulation 26 not only provides excellent thermal properties, it also acts as an adhesive to join the steel exterior and interior panels 24, and 23. Furthermore, the bulk properties of the foam provide stiffness to the assembly and load-bearing characteristics. It may be noted that this manufacturing process is continuous, and the finished panels are cut to desired length from the continuous output of the assembly line. The assembly of the inner steel panel with the outer steel panel and the foam insulation is known in the prior art, and is not a part of the present invention.

It should be noted that the key to the remarkable stucco-like appearance of the finished product is due to the very low gloss (~5%) textured ceramic pigmented polyester coating, together with the double-embossing process. The surface pattern tends to appear non-directional when it is double embossed, even though the individual embossments are directional, a fact necessitated by the linear pass-through of the steel sheet in the embossing rollers.

Although the invention has been described with respect to an insulated steel wall panel that has steel interior and exterior surfaces, it may be appreciated that the interior panel may comprise other materials, or may be provided with a pattern of its own for esthetic purposes. Likewise, the exterior panel may be embossed with patterns other than the standard patterns described herein, in order to achieve an exterior manifestation that may differ from the stucco appearance yet comprises an attractive visual appearance.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for forming an insulated structural wall panel having a generally flat exterior steel sheet having an exterior surface and assembled to an insulating core, comprising:
coating said exterior surface of said generally flat exterior steel sheet with a low gloss protective layer;
applying a first embossing with a first pattern to said low gloss protective layer of the exterior surface of said exterior steel sheet;
applying a second embossing with a second pattern to said low gloss protective layer of the exterior surface of said exterior steel sheet, whereby said exterior surface achieves the appearance of natural stucco;
maintaining said generally flat configuration of said exterior steel sheet during said first and second embossing steps, and,
thereafter assembling said exterior steel sheet to said insulating core.

2. The method of claim 1, wherein said protective layer comprises a baked-on polyester coating.

3. The method of claim 2, wherein said coating comprises a textured ceramic pigmented polyester material having a gloss rating of approximately 5%.

4. A method for treating a generally flat steel sheet having an exterior surface for use in building construction to achieve a natural stucco appearance, including the steps of:
coating said exterior surface of said steel sheet with a low gloss protective layer;
applying a first embossing with a first pattern to said low gloss protective layer of the exterior surface of said exterior steel sheet;
applying a second embossing with a second pattern to said low gloss protective layer of the exterior surface of said exterior steel sheet, whereby said exterior surface achieves the appearance of natural stucco;
maintaining said generally flat configuration of said exterior steel sheet during said first and second embossing steps.

5. The method of claim 4, wherein said protective layer comprises a baked-on polyester coating.

6. The method of claim 5, wherein said coating comprises a textured ceramic pigmented polyester material having a gloss rating of approximately 5%.

* * * * *